(12) United States Patent
Leather et al.

(10) Patent No.: US 8,933,945 B2
(45) Date of Patent: Jan. 13, 2015

(54) DIVIDING WORK AMONG MULTIPLE GRAPHICS PIPELINES USING A SUPER-TILING TECHNIQUE

(75) Inventors: Mark M. Leather, Saratoga, CA (US); Eric Demers, Palo Alto, CA (US)

(73) Assignee: ATI Technologies ULC, Markham, Ontario (CA)

( * ) Notice: Subject to any disclaimer, the term of this patent is extended or adjusted under 35 U.S.C. 154(b) by 1808 days.

(21) Appl. No.: 10/459,797

(22) Filed: Jun. 12, 2003

(65) Prior Publication Data
US 2004/0100471 A1  May 27, 2004

Related U.S. Application Data

(60) Provisional application No. 60/429,641, filed on Nov. 27, 2002.

(51) Int. Cl.
*G06T 1/20* (2006.01)
*G06F 13/14* (2006.01)
*G06F 12/02* (2006.01)
*G06T 11/40* (2006.01)
*G06T 15/00* (2011.01)
*G09G 5/36* (2006.01)

(52) U.S. Cl.
CPC . *G06T 11/40* (2013.01); *G06T 1/20* (2013.01); *G06T 15/005* (2013.01); *G09G 5/363* (2013.01)
USPC .............................. 345/506; 345/519; 345/544

(58) Field of Classification Search
USPC ......... 345/506, 530, 505, 588, 544, 545, 532, 345/501, 502, 531, 519
See application file for complete search history.

(56) References Cited

U.S. PATENT DOCUMENTS

| | | | |
|---|---|---|---|
| 4,885,703 A | 12/1989 | Deering | |
| 5,179,640 A * | 1/1993 | Duffy | ............................ 345/596 |
| 5,550,962 A | 8/1996 | Nakamura et al. | |
| 5,745,118 A * | 4/1998 | Alcorn et al. | .................. 345/587 |
| 5,794,016 A * | 8/1998 | Kelleher | ........................ 345/505 |
| 5,818,469 A | 10/1998 | Lawless et al. | |
| 5,905,506 A * | 5/1999 | Hamburg | ...................... 345/672 |
| 5,977,997 A | 11/1999 | Vainsencher | |
| 5,999,196 A | 12/1999 | Storm et al. | |
| 6,118,452 A | 9/2000 | Gannett | |

(Continued)

OTHER PUBLICATIONS

Elias, Hugo. "Polygon Scan Converting." http://freespace.virgin.net/hugo.elias/graphics/x_polysc.htm.*

(Continued)

*Primary Examiner* — Joni Richer
(74) *Attorney, Agent, or Firm* — Faegre Baker Daniels LLP

(57) ABSTRACT

A graphics processing circuit includes at least two pipelines operative to process data in a corresponding set of tiles of a repeating tile pattern, a respective one of the at least two pipelines operative to process data in a dedicated tile, wherein the repeating tile pattern includes a horizontally and vertically repeating pattern of square regions. A graphics processing method includes receiving vertex data for a primitive to be rendered; generating pixel data in response to the vertex data; determining the pixels within a set of tiles of a repeating tile pattern to be processed by a corresponding one of at least two graphics pipelines in response to the pixel data, the repeating tile pattern including a horizontally and vertically repeating pattern of square regions; and performing pixel operations on the pixels within the determined set of tiles by the corresponding one of the at least two graphics pipelines.

21 Claims, 5 Drawing Sheets

(56) References Cited

U.S. PATENT DOCUMENTS

| | | |
|---|---|---|
| 6,184,906 B1 * | 2/2001 | Wang et al. .................... 345/532 |
| 6,219,062 B1 | 4/2001 | Matsuo et al. |
| 6,222,550 B1 | 4/2001 | Rosman et al. |
| 6,292,200 B1 | 9/2001 | Bowen et al. |
| 6,323,860 B1 | 11/2001 | Zhu et al. |
| 6,344,852 B1 | 2/2002 | Zhu et al. |
| 6,353,439 B1 | 3/2002 | Lindholm et al. |
| 6,380,935 B1 | 4/2002 | Heeschen et al. |
| 6,384,824 B1 | 5/2002 | Morgan et al. |
| 6,407,736 B1 | 6/2002 | Regan |
| 6,417,858 B1 | 7/2002 | Bosch et al. |
| 6,424,345 B1 | 7/2002 | Smith et al. |
| 6,557,083 B1 | 4/2003 | Sperber et al. |
| 6,570,579 B1 * | 5/2003 | MacInnis et al. ............. 345/629 |
| 6,573,893 B1 | 6/2003 | Naqvi et al. |
| 6,636,232 B2 | 10/2003 | Larson |
| 6,650,327 B1 | 11/2003 | Airey et al. |
| 6,650,330 B2 | 11/2003 | Lindholm et al. |
| 6,697,063 B1 | 2/2004 | Zhu |
| 6,714,203 B1 * | 3/2004 | Morgan et al. ................ 345/506 |
| 6,724,394 B1 | 4/2004 | Zatz et al. |
| 6,731,289 B1 | 5/2004 | Peercy et al. |
| 6,750,867 B1 | 6/2004 | Gibson |
| 6,753,878 B1 * | 6/2004 | Heirich et al. ................ 345/629 |
| 6,762,763 B1 * | 7/2004 | Migdal et al. ................ 345/506 |
| 6,778,177 B1 * | 8/2004 | Furtner ......................... 345/544 |
| 6,791,559 B2 | 9/2004 | Baldwin |
| 6,801,203 B1 | 10/2004 | Hussain |
| 6,809,732 B2 | 10/2004 | Zatz et al. |
| 6,864,893 B2 | 3/2005 | Zatz |
| 6,864,896 B2 * | 3/2005 | Perego .......................... 345/542 |
| 6,897,871 B1 | 5/2005 | Morein et al. |
| 6,980,209 B1 | 12/2005 | Donham et al. |
| 7,015,913 B1 | 3/2006 | Lindholm et al. |
| 7,061,495 B1 | 6/2006 | Leather |
| 7,170,515 B1 | 1/2007 | Zhu |
| 2002/0145612 A1 | 10/2002 | Blythe et al. |
| 2003/0076320 A1 | 4/2003 | Collodi |
| 2003/0164830 A1 * | 9/2003 | Kent .............................. 345/505 |
| 2004/0041814 A1 | 3/2004 | Wyatt et al. |
| 2004/0164987 A1 | 8/2004 | Aronson et al. |
| 2005/0068325 A1 | 3/2005 | Lefebvre et al. |
| 2005/0200629 A1 | 9/2005 | Morein et al. |
| 2006/0170690 A1 | 8/2006 | Leather |

OTHER PUBLICATIONS

European Search Report from European Patent Office; European Application No. 03257464.2; dated Apr. 4, 2006.

Foley, James et al.; Computer Graphics, Principles and Practice; Addison-Wesley Publishing Company; 1990; pp. 873-899.

Crockett, Thomas W.; An introduction to parallel rendering; Elsevier Science B.V.; 1997; pp. 819-843.

Montrym, John S. et al.; InfiniteReality: A Real-Time Graphics System; Silicon Graphics Computer Systems; 1997; pp. 293-302.

Humphreys, Greg et al.; WireGL: A Scalable Grpahics System for Clusters; ACM Siggraph; 2001; pp. 129-140.

Akeley, K. et al.: High-Performance Polygon Rendering; ACM Computer Graphics; vol. 22, No. 4; 1988; pp. 239-246.

Breternitz, Jr., Mauricio et al.; Compilation, Architectural Support, and Evaluation of SIMD Graphics Pipeline Programs on a General-Purpose CPU; IEEE; 2003; pp. 1-11.

International Search Report for PCT Patent Application PCT/IB2004/003821 dated Mar. 22, 2005.

Fuchs, Henry et al.; Pixel-Planes 5: A Heterogeneous Multiprocessor Graphics System Using Processor-Enhanced Memories; Computer Graphics; vol. 23, No. 3; Jul. 1989; pp. 79-88.

* cited by examiner

DIVIDING WORK AMONG MULTIPLE GRAPHICS PIPELINES USING A SUPER-TILING TECHNIQUE

This application claims the benefit of U.S. Provisional Application Ser. No. 60/429,641 filed Nov. 27, 2002, entitled "Dividing Work Among Multiple Graphics Pipelines Using a Super-Tiling Technique", having as inventors Mark M. Leather and Eric Demers, and owned by instant assignee.

RELATED CO-PENDING APPLICATION

This is a related application to a co-pending application entitled "Parallel Pipeline Graphics System", having Ser. No. 10/724,384, having Leather et al. as the inventors, filed on Nov. 26, 2003, owned by the same assignee and hereby incorporated by reference in its entirety.

FIELD OF THE INVENTION

The present invention generally relates to graphics processing circuitry and, more particularly, to dividing graphics processing operations among multiple pipelines.

BACKGROUND OF THE INVENTION

Computer graphics systems, set top box systems or other graphics processing systems typically include a host processor, graphics (including video) processing circuitry, memory (e.g. frame buffer), and one or more display devices. The host processor may have a graphics application running thereon, which provides vertex data for a primitive (e.g. triangle) to be rendered on the one or more display devices to the graphics processing circuitry. The display device, for example, a CRT display includes a plurality of scan lines comprised of a series of pixels. When appearance attributes (e.g. color, brightness, texture) are applied to the pixels, an object or scene is presented on the display device. The graphics processing circuitry receives the vertex data and generates pixel data including the appearance attributes which may be presented on the display device according to a particular protocol. The pixel data is typically stored in the frame buffer in a manner that corresponds to the pixels location on the display device.

FIG. 1 illustrates a conventional display device 10, having a screen 12 partitioned into a series of vertical strips 13-18. The strips 13-18 are typically 1-4 pixels in width. In like manner, the frame buffer of conventional graphics processing systems is partitioned into a series of vertical strips having the same screen space width. Alternatively, the frame buffer and the display device may be partitioned into a series of horizontal strips. Graphics calculations, for example, lighting, color, texture and user viewing information are performed by the graphics processing circuitry on each of the primitives provided by the host. Once all calculations have been performed on the primitives, the pixel data representing the object to be displayed is written into the frame buffer. Once the graphics calculations have been repeated for all primitives associated with a specific frame, the data stored in the frame buffer is rendered to create a video signal that is provided to the display device.

The amount of time taken for an entire frame of information to be calculated and provided to the frame buffer becomes a bottleneck in graphics systems as the calculations associated with the graphics become more complicated. Contributing to the increased complexity of the graphics calculation is the increased need for higher resolution video, as well as the need for more complicated video, such as 3-D video.

The video image observed by the human eye becomes distorted or choppy when the amount of time taken to render an entire frame of video exceeds the amount of time in which the display device must be refreshed with a new graphic or frame in order to avoid perception by the human eye. To decrease processing time, graphics processing systems typically divide primitive processing among several graphics processing circuits where, for example, one graphics processing circuit is responsible for one vertical strip (e.g. 13) of the frame while another graphics processing circuit is responsible for another vertical strip (e.g. 14) of the frame. In this manner, the pixel data is provided to the frame buffer within the required refresh time.

Load balancing is a significant drawback associated with the partitioning systems as described above. Load balancing problems occur, for example, when all of the primitives 20-23 of a particular object or scene are located in one strip (e.g. strip 13) as illustrated in FIG. 1. When this occurs, only the graphics processing circuit responsible strip 13 is actively processing primitives; the remaining graphics processing circuits are idle. This results in a significant waste of computing resources as at most only half of the graphics processing circuits are operating. Consequently, graphics processing system performance is decreased as the system is only operating at a maximum of fifty percent capacity.

Changing the width of the strips has been employed to counter the system performance problems. However, when the width of a strip is increased, the load balancing problem is enhanced as more primitives are located within a single strip; thereby, increasing the processing required of the graphics processing circuit responsible for that strip, while the remaining graphics processing circuits remain idle. When the width of the strip is decreased (e.g. four bits to two bits), cache (e.g. texture cache) efficiency is decreased as the number of cache lines employed in transferring data is reduced in proportion to the decreased width of the strip. In either case, graphics processing system performance is still decreased due to the idle graphics processing circuits.

Frame based subdivision has been used to overcome the performance problems associated with conventional partitioning systems. In frame based subdivision, each graphics processor is responsible for processing an entire frame, not strips within the same frame. The graphics processors then alternate frames. However, frame subdivision introduces one or more frames of latency between the user and the screen, which is unacceptable in real-time interactive environments, for example, providing graphics for a flight simulator application.

BRIEF DESCRIPTION OF THE DRAWINGS

The present invention and the related advantages and benefits provided thereby, will be best appreciated and understood upon review of the following detailed description of a preferred embodiment, taken in conjunction with the following drawings, where like numerals represent like elements, in which.

DETAILED DESCRIPTION OF A PREFERRED EMBODIMENT

A multi-pipeline graphics processing circuit includes at least two pipelines operative to process data in a corresponding tile of a repeating tile pattern, a respective one of the at least two pipelines is operative to process data in a dedicated tile, wherein the repeating tile pattern includes a horizontally and vertically repeating pattern of square regions. The multi-pipeline graphics processing circuit may be coupled to a frame buffer that is subdivided into a replicating pattern of square regions (e.g. tiles), where each region is processed by a corresponding one of the at least two pipelines such that load balancing and texture cache utilization is enhanced.

A multi-pipeline graphics processing method includes receiving vertex data for a primitive to be rendered, generating pixel data in response to the vertex data, determining the pixels within a set of tiles of a repeating tile pattern to be processed by a corresponding one of at least two graphics pipelines in response to the pixel data, the repeating tile pattern including a horizontally and vertically repeating pattern of square regions, and performing pixel operations on the pixels within the determined set of tiles by the corresponding one of the at least two graphics pipelines. An exemplary embodiment of the present invention will now be described with reference to FIGS. 2-6.

Figure 2:
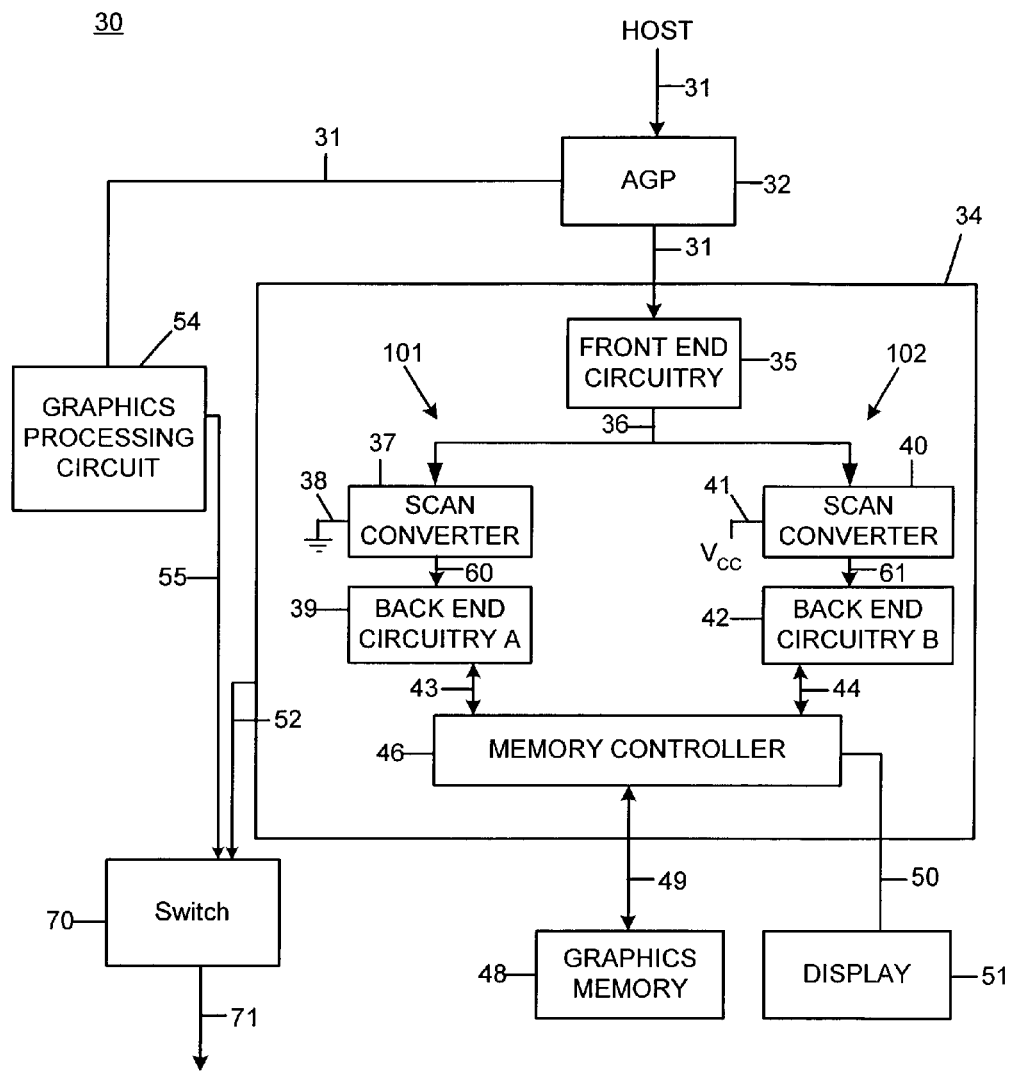
FIG. 2 is a schematic block diagram of a graphics processing system employing an exemplary multi-pipeline graphics processing circuit according to one embodiment of the present invention.

FIG. 2 is a schematic block diagram of an exemplary graphics processing system 30 employing an example of a multi-pipeline graphics processing circuit 34 according to one embodiment of the present invention. The graphics processing system 30 can be implemented with a single graphics processing circuit 34 or with two or more graphics processing circuits 34, 54. The components and corresponding functionality of the graphics processing circuits 34, 54 are substantially the same. Therefore, only the structure and operation of graphics processing circuit 34 will be described in detail. An alternate embodiment, employing both graphics processing circuits 34 and 54 will be discussed in greater detail below with reference to FIGS. 4-5.

Graphics data 31, for example, vertex data of a primitive (e.g. triangle) 80 (FIG. 3) is transmitted as a series of strips to the graphics processing circuit 34. As used herein, graphics data 31 can also include video data or a combination of video data and graphics data. The graphics processing circuit 34 is preferably a portion of a stand-alone graphics processor chip or may also be integrated with a host processor or other circuit, if desired, or part of a larger system. The graphics data 31 is provided by a host (not shown). The host may be a system processor (not shown) or a graphics application running on the system processor. In an alternate embodiment, an Accelerated Graphics Port (AGP) 32 or other suitable port receives the graphics data 31 from the host and provides the graphics data 31 to the graphics processing circuit 34 for further processing.

The graphics processing circuit 34 includes a first graphics pipeline 101 operative to process graphics data in a first set of tiles as discussed in greater detail below. The first pipeline 101 includes front end circuitry 35, a scan converter 37, and back end circuitry 39. The graphics processing circuit 34 also includes a second graphics pipeline 102, operative to process graphics data in a second set of tiles as discussed in greater detail below. The first graphics pipeline 101 and the second graphics pipeline 102 operate independently of one another. The second graphics pipeline 102 includes the front end circuitry 35, a scan converter 40, and back end circuitry 42. Thus, the graphics processing circuit 34 of the present invention is configured as a multi-pipeline circuit, where the back end circuitry 39 of the first graphics pipeline 101 and the back end circuitry 42 of the second graphics pipeline 102 share the front end circuitry 35, in that the first and second graphics pipelines 101 and 102 receive the same pixel data 36 provided by the front end circuitry 35. Alternatively, the back end circuitry 39 of the first graphics pipeline 101 and the back end circuitry 42 of the second graphics pipeline 102 may be coupled to separate front end circuits. Additionally, it will be appreciated that a single graphics processing circuit can be configured in similar fashion to include more than two graphics pipelines. The illustrated graphics processing circuit 34 has the first and second pipelines 101-102 present on the same chip. However, in alternate embodiments, the first and second graphics pipelines 101-102 may be present on multiple chips interconnected by suitable communication circuitry or a communication path, for example, a synchronization signal or data bus interconnecting the respective memory controllers.

The front end circuitry 35 may include, for example, a vertex shader, set up circuitry, rasterizer or other suitable circuitry operative to receive the primitive data 31 and generate pixel data 36 to be further processed by the back end circuitry 39 and 42, respectively. The front end circuitry 35 generates the pixel data 36 by performing, for example, clipping, lighting, spatial transformations, matrix operations and rasterizing operations on the primitive data 31. The pixel data 36 is then transmitted to the respective scan converters 37 and 40 of the two graphics pipelines 101-102.

The scan converter 37 of the first graphics pipeline 101 receives the pixel data 36 and sequentially provides the position (e.g. x, y) coordinates 60 in screen space of the pixels to be processed by the back end circuitry 39 by determining or identifying those pixels of the primitive, for example, the pixels within portions 81-82 of the triangle 80 (FIG. 3) that intersect the tile or set of tiles that the back end circuitry 39 is responsible for processing. The particular tile(s) that the back end circuitry 39 is responsible for is determined based on the tile identification data present on the pixel identification line 38 of the scan converter 37. The pixel identification line 38 is illustrated as being hard wired to ground. Thus, the tile identification data corresponds to a logical zero. This corresponds to the back end circuitry 39 being responsible for processing the tiles labeled "A" (e.g. 72 and 75) in FIG. 3. Although the pixel identification line 38 is illustrated as being hard wired to a fixed value, it is to be understood and appreciated that the tile identification data can be programmable data, for example, from a suitable driver and such a configuration is contemplated by the present invention and is within the spirit and scope of the instant disclosure.

Back end circuitry 39 may include, for example, pixel shaders, blending circuits, z-buffers or any other circuitry for performing pixel appearance attribute operations (e.g. color, texture blending, z-buffering) on those pixels located, for example, in tiles 72, 75 (FIG. 3) corresponding to the position coordinates 60 provided by the scan converter 37. The processed pixel data 43 is then transmitted to graphics memory 48 via memory controller 46 for storage therein at locations corresponding to the position coordinates 60.

The scan converter 40 of the second graphics pipeline 102, receives the pixel data 36 and sequentially provides position (e.g. x, y) coordinates 61 in screen space of the pixels to be processed by the back end circuitry 42 by determining those pixels of the primitive, for example, the pixels within portions 83-84 of the triangle 80 (FIG. 3) that intersect the tiles that the back end circuitry 42 is responsible for processing. Back end circuitry 42 tile responsibility is determined based on the tile identification data present on the pixel identification line 41 of the scan converter 41. The pixel identification line 41 is illustrated as being hard wired to $V_{CC}$; thus, the tile identification data corresponds to a logical one. This corresponds to the back end circuitry 42 being responsible for processing the tiles labeled "B" (e.g. 73-74) in FIG. 3. Although the pixel identification line 41 is illustrated as being hard wired to a fixed value, it is to be understood and appreciated that the tile identification data can be programmable data, for example, from a suitable driver and such configuration is contemplated by the present invention and is within the spirit and scope of the instant disclosure.

Back end circuitry 42 may include, for example, pixel shaders, blending circuits, z-buffers or any suitable circuitry for performing pixel appearance attribute operations on those pixels located, for example, in tiles 73 and 74 (FIG. 3) corresponding to the position coordinates 61 provided by the scan converter 40. The processed pixel data 44 is then transmitted to the graphics memory 48, via memory controller 46, for storage therein at locations corresponding to the position coordinates 61.

The memory controller 46 is operative to transmit and receive the processed pixel data 43-44 from the back end circuitry 39 and 42; transmit and retrieve pixel data 49 from the graphics memory 48; and in a single circuit implementation, transmit pixel data 50 for presentation on a suitable display 51. The display 51 may be a monitor, a CRT, a high definition television (HDTV) or any other device or combination thereof.

Figure 3:
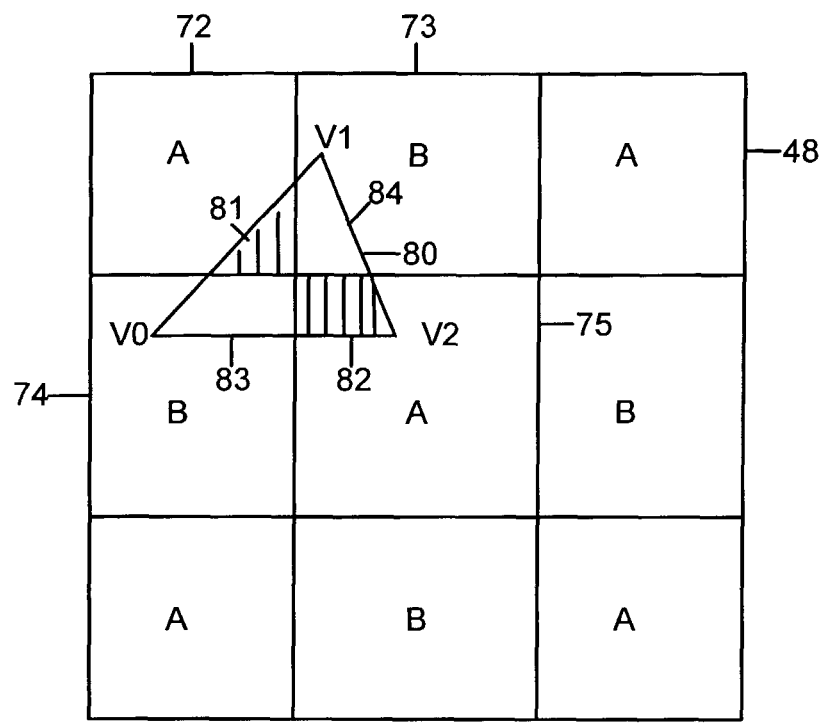
FIG. 3 is a schematic block diagram of a memory partitioned into an exemplary super-tile pattern according to the present invention.

Graphics memory 48 may include, for example, a frame buffer that also stores one or more texture maps. Referring to FIG. 3, the frame buffer portion of the graphics memory 48 is partitioned in a repeating tile pattern of horizontal and vertical square regions or tiles 72-75, where the regions 72-75 provide a two dimensional partitioning of the frame buffer portion of the memory 48. Each tile is implemented as a 16×16 pixel array. The repeating tile pattern of the frame buffer 48 corresponds to the partitioning of the corresponding display 51 (FIG. 2). When rendering a primitive (e.g. triangle) 80, the first graphics pipeline 101 processes only those pixels in portions 81, 82 of the primitive 80 that intersects tiles labeled "A", for example, 72 and 75, as the back end circuitry 39 is responsible for the processing of tiles corresponding to tile identification 0 present on pixel identification line 38 (FIG. 2). In corresponding fashion, the second graphics pipeline 102 processes only those pixels in portions 83, 84 of the primitive 80 that intersects tiles labeled "B", for example 73-74, as the back end circuitry 42 (FIG. 2) is responsible for the processing of tiles corresponding to tile identification 1 present on pixel identification line 41 (FIG. 2).

By configuring the frame buffer 48 according to the present invention, as the primitive data 31 is typically written in strips, the tiles (e.g. 72 and 75) being processed by the first graphics pipeline 101 and the tiles (e.g. 73 and 74) being processed by the second graphics pipeline 102 will be substantially equal in size, notwithstanding the primitive 80 orientation. Thus, the amount of processing performed by the first graphics pipeline 101 and the second graphics pipeline 102, respectively, are substantially equal; thereby, effectively eliminating the load balance problems exhibited by conventional techniques.

Figure 4:
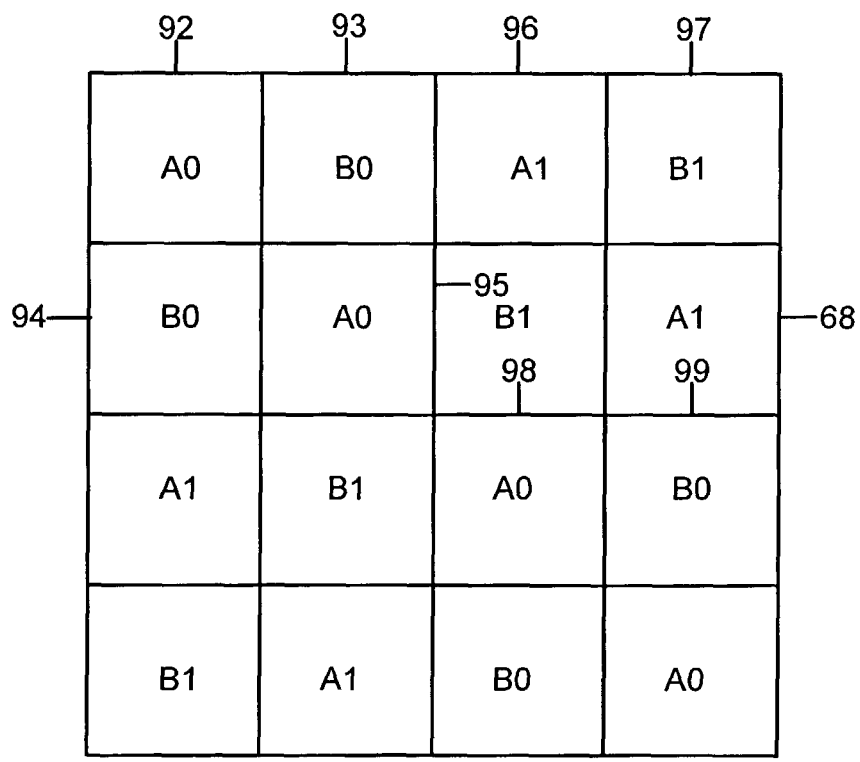
FIG. 4 is a schematic block diagram of a memory partitioned into a super-tile pattern according to an alternate embodiment of the present invention.

FIG. 4 is a schematic block diagram of a frame buffer 68 partitioned into a super-tile pattern according to an alternate embodiment of the present invention. Such a partitioning would be used, for example, in conjunction with a multi-processor implementation to be discussed below with reference to FIG. 5. As illustrated, the frame buffer 68 is partitioned into a repeating tile pattern where the tiles, for example, 92-99 that form the repeating tile pattern are the responsibility of and processed by a corresponding one of the graphics pipelines provided by the multi-processor implementation.

Figure 1:
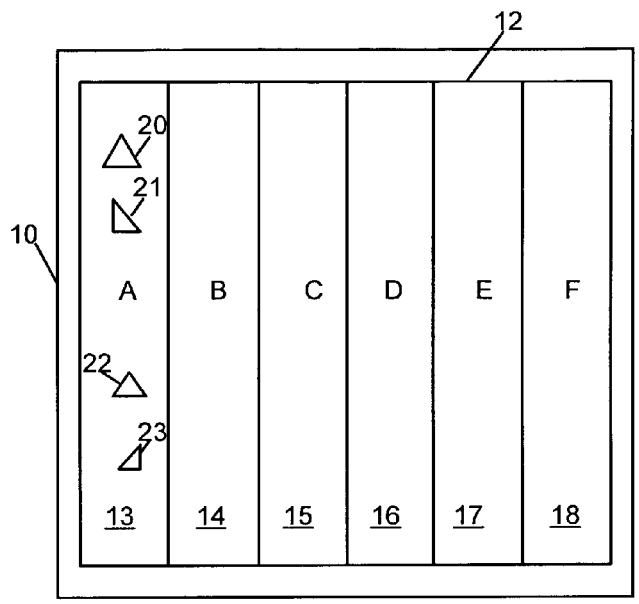
FIG. 1 is a schematic block diagram of a conventional display partitioned into several vertical strips.
Figure 5:
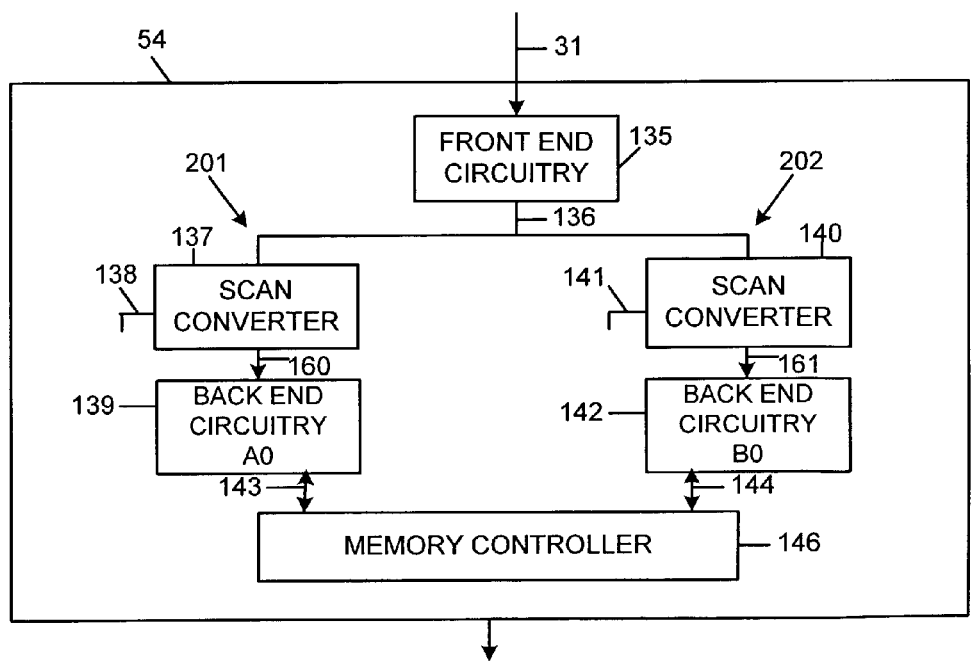
FIG. 5 is a schematic block diagram of an exemplary multi-pipeline graphics processing circuit used in a multi processor configuration according to an alternate embodiment of the present invention.

FIG. 5 is a schematic block diagram of a graphics processing circuit 54 which may be coupled with the graphics processing circuit 34 (FIG. 2), for example, by the AGP 32 or other suitable port, to form one embodiment of a multi-processor implementation. The graphics processing circuit 54 is preferably a portion of a stand-alone graphics processor chip or may also be integrated with a host processor or other circuit, if desired, or port of a larger system. The multi-processor implementation exhibits an increased fill rate of, for example, 9.6 billion pixels/sec with a triangle rate of 300 million triangles/sec. This represents a tremendous performance increase as compared to conventional graphics processing systems. The triangle rate is defined as the number of triangles the graphics processing circuit can generate per second. The fill rate is defined as the number of pixels the graphics processing circuit can render per second.

Referring briefly to FIG. 2, in the multi-processor implementation, processed pixel data 52 from the graphics processing circuit 34 is provided as a first of two inputs to a high speed switch 70. The second input to the high speed switch 70 is the processed pixel data 55 from the graphics processing circuit 54. The high speed switch 70 has a switching frequency (f) sufficient to provide the pixel information 71 to a suitable display device without any detectable latency.

Returning to FIG. 5, the graphics processing circuit 54 includes a third graphics pipeline 201 operative to process graphics data in a third set of tiles. The third graphics pipeline 201 includes front end circuitry 135, which may be the front end circuitry 35 discussed with reference to FIG. 2, a scan converter 137 and back end circuitry 139. The graphics processing circuit 54 also includes a fourth graphics pipeline 202, operative to process graphics data in a fourth set of tiles. The fourth graphics pipeline 202 includes the front end circuitry 135, a scan converter 140 and back end circuitry 142. The third graphics pipeline 201 and the fourth graphics pipeline 202 also operate independently of one another. Thus, the graphics processing circuit 54 is configured as a multi-pipeline circuit, where the back end circuitry 139 of the third graphics pipeline 201 and the back end circuitry 142 of the fourth graphics pipeline 202 share the front end circuitry 135, in that the respective back end circuitry 139 and 142 receives the same pixel data from the front end circuitry 135. As illustrated, the components of the third and fourth graphics pipelines are present on a single chip. Additionally, the back end circuitry 139 and the back end circuitry 142 may be configured to share the front end circuitry 35 of the graphics processing circuit 34. Alternatively, the third and fourth graphics pipelines may be configured to be on multiple chips interconnected by a communication path, for example, a synchronization signal or data bus.

The front end circuitry 135 may include, for example, a vertex shader, set up circuitry, rasterizer or other suitable circuitry operative to receive the primitive data 31 from the AGP 32 and generate pixel data 136 to be processed by the third graphics pipeline 201 and fourth graphics pipeline 202, respectively. The front end circuitry 135 generates the pixel data 136 by performing, for example, clipping, lighting, spatial transformations, matrix operations, rasterization or any suitable primitive operations or combination thereof on the primitive data 31. The pixel data 136 is then transmitted to the respective scan converters 137 and 140 of the two graphics pipelines 201-202.

The scan converter 137 of the third graphics pipeline 201 receives the pixel data 136 and sequentially provides the position (e.g. x, y) coordinates 160 in screen space of the pixels to be processed by the back end circuitry 139, based on the tile identification data present on pixel identification line 138. In corresponding fashion, scan converter 140 of the fourth graphics pipeline 202 receives the pixel data 136 and sequentially provides the position (e.g. x, y) coordinates 161 in screen space of the pixels to be processed by the back end circuitry 143, based on the tile identification data present on pixel identification line 141.

Referring to FIG. 4, in the multi-processor implementation, when a logical zero or other suitable value is present on pixel identification line 138 (e.g. corresponding to the pixel identification line 138 being tied to ground), the back end circuitry 139 is responsible for processing, for example, tiles labeled "A0" (e.g. 92 and 95). In corresponding manner, when a logical one or other suitable value is present on pixel identification line 141 (e.g. corresponding to pixel identification line 142 being tied to $V_{CC}$), the back end circuitry 142 will be responsible for processing the tiles labeled "B0" (e.g. 93 and 94). When a logical zero or other suitable value is present on pixel identification line 38 (FIG. 2), the back end circuitry 39 is responsible for processing, for example, the tiles labeled "A1" (e.g. 96 and 99). When a logical one or other suitable value is present on pixel identification line 41 (FIG. 2), the back end circuitry 42 is responsible for processing, for example, the tiles labeled "B1" (e.g. 97 and 98). The tile pattern illustrated in FIG. 4 is referred to as a super-tile pattern 68.

As illustrated, the super-tile pattern 68 is formed of a horizontally and vertically repeating pattern of regions or tiles 92-99, where each tile is a 16×16 pixel array. With this frame buffer configuration, as the primitive data 31 is typically written in strips, at least one tile (e.g. 92) being processed by the third graphics pipeline 201 and at least one tile (e.g. 93) being processed by the fourth graphics pipeline 202 will be intersected or contain at least a portion of the primitive data 31, notwithstanding the primitive orientation; thereby achieving substantially equal load balancing between the pipelines.

Thus, in the multi-processor implementation, each of the graphics pipelines is responsible for processing 1/(M×N) of the tiles present in the partitioned graphics memory 68, where M represents the number of pipelines per circuit and N represents the number of graphics processing circuits being used. Thus, in an embodiment where graphics processing circuit 34 and graphics processing circuit 54 are combined, for example, through AGP 32 (FIG. 2), each graphics pipeline 101, 102, 201 and 202 will be responsible for processing one-fourth of the tiles 92-99 of the repeating tile pattern. This results in increased graphics processing performance as each graphics pipeline is responsible for processing one-quarter of total pixels maintained in the frame buffer 68.

Figure 6:
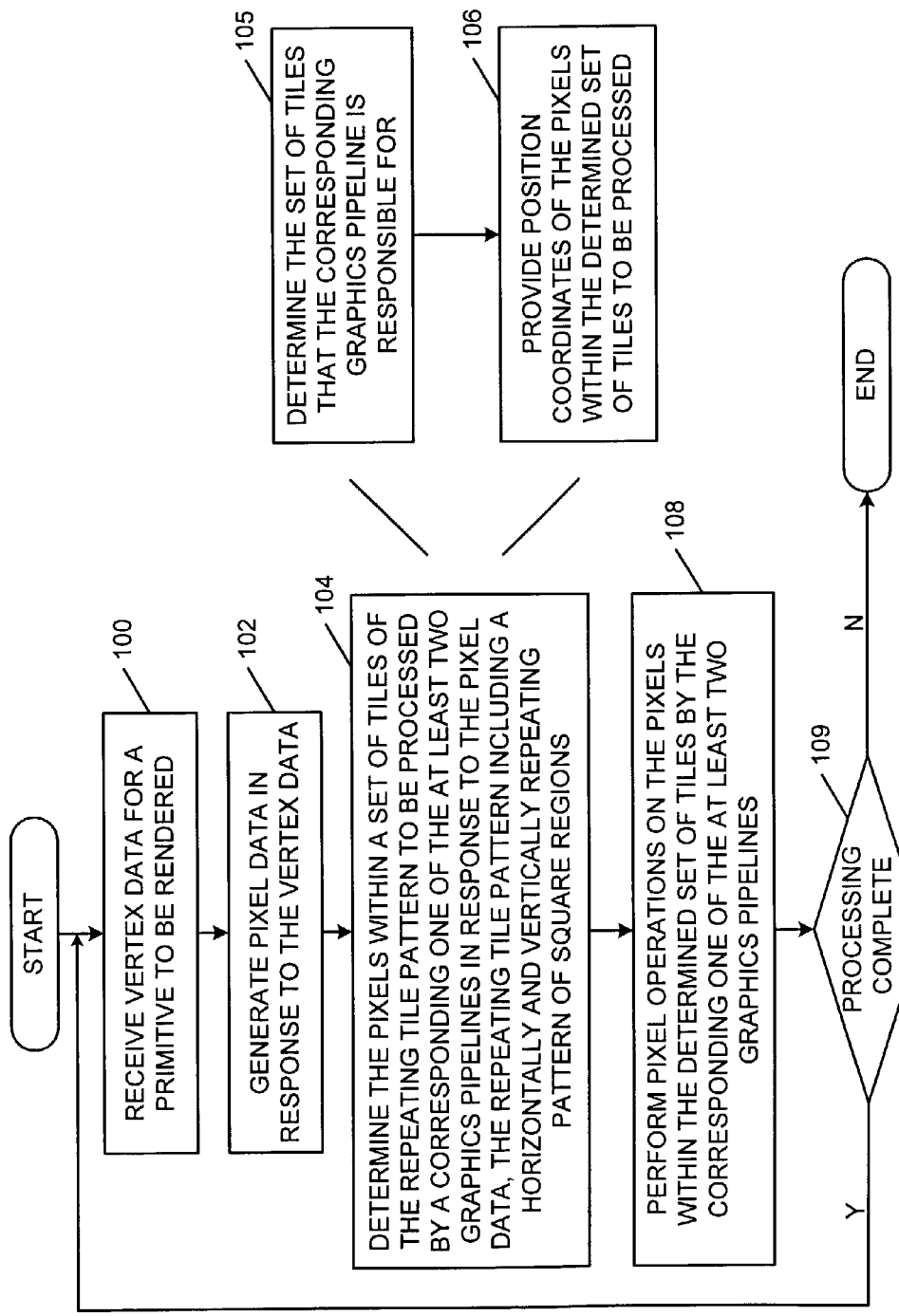
FIG. 6 is a flow chart of the operations performed by the graphics processing circuit according to the present invention.

FIG. 6 is a flow chart of the operations performed by the graphics processing circuit 34 according to the present invention. In the multi-processor implementation, graphics processing circuits 34 and 54 perform substantially the same operations. In step 100, the front end circuitry 35 receives the graphics data 31 (FIG. 2), for example, vertex data of an object to be rendered and generates corresponding pixel data 36 (FIG. 2) in response to the primitive data 31 in step 102. The pixel data may be generated by performing, for example, clipping, lighting, spatial transformations. matrix transformations and rasterizing operations on the graphics data 31.

In step 104, the pixels within a set of tiles of the repeating tile pattern to be processed by a corresponding one of the at least two graphics pipelines in response to the pixel data is determined. This is accomplished, for example, in step 105 by the scan converter 37 determining which of tiles (e.g. 72 and 75) of the repeating tile pattern are to be processed by the back end circuitry 39 based on the tile identification data present on the pixel identification line 38. Next, in step 106, the scan converter 37 provides the position coordinates 60 of the pixels within portions 81-82 of the triangle 80 that intersect the tiles (e.g. 72 and 75) to the back end circuitry 39.

In step 108, pixel operations are performed on the pixels within the determined set of tiles by the corresponding one of the at least two graphics pipelines is performed. This is accomplished, for example, by the back end circuitry 39 performing color, shading, blending, texturing and/or z-buffering operations on the pixels within the portions (e.g. 81-82) of the tiles (e.g. 72 and 75) they are responsible for.

In step 109, a determination is made as to whether the processing is complete. If the processing is complete, the process proceeds to step 100 where vertex data for a new primitive is received. Otherwise, the process ends. In the multi-processor implementation, graphics processing circuit 54 performs substantially the same operations as discussed above, in conjunction with graphics processing circuit 34.

As noted above, a rasterizer setup unit manages the distribution of polygons to the different rasterizer pipelines within a chip. The design divides the screen into multiple square tiles. Each pipeline is responsible for a subset of the tiles. In our design, the tile sizes are 8×8 pixels, 16×16 pixels (default) or 32×32 pixels. However, any number of square pixels or even non-square tiles could be done. It will be recognized that the number of pixels in the tiles be a common divisor of the number of pixels on the screen, in both X and Y directions.

Vertices are given by the application currently executing on the host. The vertices are converted from object space three-dimensional homogeneous coordinate system to a screen based coordinate system. This conversion can be done on the host processor or in the front end section of the graphics chip (i.e. vertex transformation). The screen based coordinate system has at least X and Y coordinates for each vertex.

Figure 7:
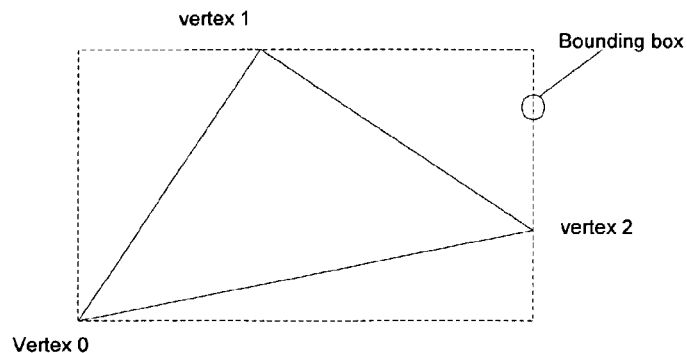
FIG. 7 is a diagram illustrating a polygon bounding box to determine which, if a polygon fits in a tile or super tile.

As shown in FIG. 7, the setup unit creates a bounding box based on the screen space X, Y coordinates of each vertex. This bounding box is then compared against the current tile pattern. This tiling pattern is based on the number of graphics pipelines currently active. In the one pipe configuration, the tiles just repeat and are all mapped to the same pipeline. In the two pipe configuration, a "checkerboard" pattern is created for the pipes and the patterns repeat over the full screen.

The bounding boxes' four corners are mapped to the tile pattern, simply by discarding the lower bits of X & Y. The four corners map to the same or different tiles. If they all map to the same tile, then only the pipeline that is associated with that tile receives the polygon. If it maps to only tiles that are associated with only one pipeline, then again only that pipeline receives the polygon. If it maps to tiles that are associated with multiple pipelines, then the entire polygon is sent to all pipelines. In one implementation, the polygon is broadcast to all pipelines, masking the pipelines that should not receive it. Consequently, polygons can be sent to only one pipe or up to all the pipes, depending on the coverage of the tiles by the polygon.

For super tiling when using multiple graphics chips, the rasterizer setup unit manages the distribution of polygons to different graphics chips. The super tiles, which are a square assembly of pixels, are used to perform load balancing between each processor. Basically, each processor is responsible for generating all of the pixels in its subset of super tiles. The tiles are distributed evenly across all processors, in a checkerboard pattern. The tile size is variable, but one implementation may be 32×32 pixels, or 2×2 tiles. This amount can be changed through programming registers. Super tiles do not have to be of a size which is a common divisor of the screen resolution, but it's more efficient if it is. The number of chips in use should be a power of two.

Figure 8:
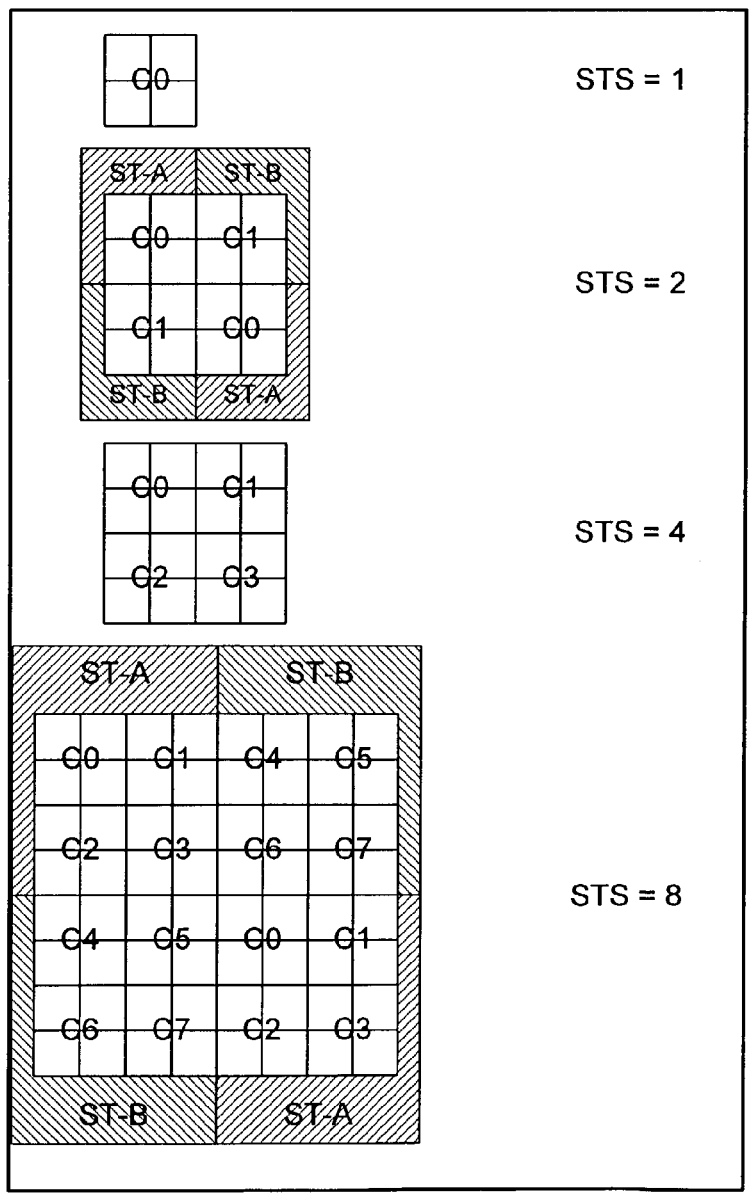
FIG. 8 is a schematic block diagram of an exemplary multi-pipeline graphics processing circuit used in a multi processor configuration according to an alternate embodiment of the present invention.

FIG. 8 shows some examples of super tile configurations for various numbers of chips (super tile size or STS). As shown, C# represents the tile that chip # controls. The patterns repeat across the whole screen, in both X & Y directions, until the full screen is fully covered. For odd powers of 2 (STS=2, STS=8), a simple square pattern of different chips cannot be made, so a secondary pattern of checkerboard is applied to generate a square arrangement.

In operation, an application generates vertex data, which assembles into polygons (i.e. 2 vertices for a line, 3 for a triangle). Each vertex's homogeneous object space coordinate (generated by the application) is transformed into screen space coordinates by either the host or the front end of the graphics chip (transform unit or vertex processor). The screen space coordinates hold X, Y coordinates (in screen pixels) for each of the vertices. The polygons coming from an application are all broadcast to all chips. Each chip processes the vertices as needed to generate the same X, Y coordinates for all vertices. Then, each chip creates a bounding box around the polygon as shown in FIG. 7. The X, Y coordinates of each corner of the bounding box is checked against the super tiles that belongs to each processor. If the bounding box overlaps a super tile assigned to a given processor, then that processor must render some or the entire polygon. The setup unit then sends the whole polygon to the various raster pipe(s). If the bounding box does not overlap any of the tiles associated with a processor, then the setup unit rejects the whole polygon and processes the next one.

In this way, triangle setup performance does not scale with each processor (since all polygons go through all setup units), but fill rate (defined as the number of pixels output total) does scale with each processor added.

The above detailed description of the invention and the examples described therein have been provided for the purposes of illustration and description. Although an exemplary embodiment of the present invention has been described in detail herein with reference to the accompanying drawings, it is to be understood that the present invention is not limited to the precise embodiment disclosed, and that various changes and modifications to the invention are possible in light of the above teaching. Accordingly, the scope of the present invention is to be defined by the claims appended hereto.

What is claimed is:

1. A graphics processing circuit, comprising:
    at least two graphics pipelines on a same chip operative to process data in a corresponding set of tiles of a repeating tile pattern corresponding to screen locations, a respective one of the at least two graphics pipelines operative to process data in a dedicated tile; and
    a memory controller on the chip in communication with the at least two graphics pipelines, operative to transfer pixel data between each of a first pipeline and a second pipeline and a memory shared among the at least two graphics pipelines;
    wherein the repeating tile pattern includes a horizontally and vertically repeating pattern of square regions.

2. The graphics processing circuit of claim 1, wherein the square regions comprise a two dimensional partitioning of memory.

3. The graphics processing circuit of claim 2, wherein the memory is a frame buffer.

4. The graphics processing circuit of claim 1, wherein each of the at least two graphics pipelines further includes front end circuitry operative to receive vertex data and generate pixel data corresponding to a primitive to be rendered, and back end circuitry, coupled to the front end circuitry, operative to receive and process a portion of the pixel data.

5. The graphics processing circuit of claim 4, wherein each of the at least two graphics pipelines further includes a scan converter, coupled to the back end circuitry, operative to determine the portion of the pixel data to be processed by the back end circuitry.

6. The graphics processing circuit of claim 4, wherein the at least two graphics pipelines separately receive the pixel data from the front end circuitry.

7. The graphics processing circuit of claim 6, wherein a first of the at least two graphics pipelines processes the pixel data only in a first set of tiles in the repeating tile pattern.

8. The graphics processing circuit of claim 7, wherein the first of the at least two graphics pipelines further includes a scan converter, coupled to the front end circuitry and the back end circuitry, operative to provide position coordinates of the pixels within the first set of tiles to be processed by the back end circuitry, the scan converter including a pixel identification line for receiving tile identification data indicating which of the set of tiles is to be processed by the back end circuitry.

9. The graphics processing circuit of claim 1, wherein each tile of the set of tiles further comprises a 16×16 pixel array.

10. The graphics processing circuit of claim 1, wherein a second of the at least two graphics pipelines processes the data only in a second set of tiles in the repeating tile pattern.

11. The graphics processing circuit of claim 10, wherein the second of the at least two graphics pipelines further includes a scan converter, coupled to front end circuitry and back end circuitry, operative to provide position coordinates of the pixels within the second set of tiles to be processed by the back end circuitry, the scan converter including a pixel identification line for receiving tile identification data indicating which of the set of tiles is to be processed by the back end circuitry.

12. The graphics processing circuit of claim 1 including a third graphics pipeline and a fourth graphics pipeline, wherein the third graphics pipeline includes front end circuitry operative to receive vertex data and generate pixel data corresponding to a primitive to be rendered, and back end circuitry, coupled to the front end circuitry, operative to receive and process the pixel data in a third set of tiles in the repeating tile pattern, and wherein the fourth graphics pipeline includes front end circuitry operative to receive vertex data and generate pixel data corresponding to a primitive to be rendered, and back end circuitry, coupled to the front end circuitry, operative to receive and process the pixel data in a fourth set of tiles in the repeating tile pattern.

13. The graphics processing circuit of claim 12, wherein the third graphics pipeline further includes a scan converter, coupled to the front end circuitry and the back end circuitry, operative to provide position coordinates of the pixels within the third set of tiles to be processed by the back end circuitry, the scan converter including a pixel identification line for receiving tile identification data indicating which of the sets of tiles is to be processed by the back end circuitry.

14. The graphics processing circuit of claim 12, wherein the fourth graphics pipeline further includes a scan converter, coupled to the front end circuitry and the back end circuitry, operative to provide position coordinates of the pixels within the fourth set of tiles to be processed by the back end circuitry, the scan converter including a pixel identification line for receiving tile identification data indicating which of the sets of tiles is to be processed by the back end circuitry.

15. The graphics processing circuit of claim 12, wherein the third and fourth graphics pipelines are on separate chips.

16. The graphics processing circuit of claim 15 wherein the data includes a polygon and wherein each separate chip creates a bounding box around the polygon and wherein each corner of the bounding box is checked against a super tile that belongs to each separate chip and wherein if the bounding box does not overlap any of the super tiles associated with a separate chip, then the processing circuit rejects the whole polygon and processes a next one.

17. The graphics processing circuit of claim 12, further including a bridge operative to transmit vertex data to each of the first, second, third and fourth graphics pipelines.

18. A graphics processing method, comprising:
receiving vertex data for a primitive to be rendered;
generating pixel data in response to the vertex data;
passing the same pixel data to both of the at least two graphics pipelines on a same chip;
determining the pixels within a set of tiles of a repeating tile pattern corresponding to screen locations to be processed by a corresponding one of the at least two graphics pipelines on a same chip in response to the pixel data, the repeating tile pattern including a horizontally and vertically repeating pattern of square regions;
performing pixel operations on the pixels within the determined set of tiles by the corresponding one of the at least two graphics pipelines; and
transmitting the processed pixels to a memory controller, wherein the at least two graphics pipelines share the memory controller wherein the memory controller transfers pixel data from each of the at least two pipelines, to a shared memory.

19. The graphics processing method of claim 18, wherein determining the pixels within a set of tiles of the repeating tile pattern to be processed further comprises determining the set of tiles that the corresponding graphics pipeline is responsible for.

20. The graphics processing method of claim 18, wherein determining the pixels within a set of tiles of the repeating tile pattern to be processed further comprises providing position coordinates of the pixels within the determined set of tiles to be processed to the corresponding one of the at least two graphics pipelines.

21. A graphics processing circuit, comprising:
at least two graphics pipelines on a chip operative to process data in a corresponding set of tiles of a repeating tile pattern corresponding to screen locations, a respective one of the at least two graphics pipelines operative to process data in a dedicated tile, wherein the repeating tile pattern includes a horizontally and vertically repeating pattern of regions;
wherein the horizontally and vertically repeating pattern of regions include N×M number of pixels; and a memory controller on the chip, coupled to the at least two graphics pipelines on the chip and operative to transfer pixel data between each of the two graphics pipelines and a memory shared among the at least two graphics pipelines.

\* \* \* \* \*